United States Patent
Peterson

(10) Patent No.: US 11,400,687 B2
(45) Date of Patent: Aug. 2, 2022

(54) CTE-MATCHED HYBRID TUBE LAMINATE DOUBLER

(71) Applicant: Eagle Technology, LLC, Melbourne, FL (US)

(72) Inventor: Ian D. Peterson, Rochester, NY (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 16/823,958

(22) Filed: Mar. 19, 2020

(65) Prior Publication Data

US 2021/0291485 A1  Sep. 23, 2021

(51) Int. Cl.
| | |
|---|---|
| *B32B 5/26* | (2006.01) |
| *B32B 1/08* | (2006.01) |
| *B32B 5/06* | (2006.01) |
| *H01Q 1/36* | (2006.01) |

(52) U.S. Cl.
CPC .............. *B32B 5/26* (2013.01); *B32B 1/08* (2013.01); *B32B 5/06* (2013.01); *H01Q 1/36* (2013.01); *B32B 2307/30* (2013.01); *B32B 2307/54* (2013.01); *B32B 2313/04* (2013.01); *B32B 2597/00* (2013.01)

(58) Field of Classification Search
CPC .... B32B 5/26; B32B 1/08; B32B 5/06; B32B 2307/30; B32B 2307/54; B32B 2313/04; B32B 2597/00; H01Q 1/36
USPC ....................................... 174/126.2
See application file for complete search history.

(56) References Cited

U.S. PATENT DOCUMENTS

| | | | |
|---|---|---|---|
| 3,430,661 A | * | 3/1969 | Sabine ............. F16L 23/125 138/109 |
| 3,651,661 A | | 3/1972 | Darrow |
| 6,326,685 B1 | | 12/2001 | Jin et al. |
| 2005/0126106 A1 | | 6/2005 | Murphy et al. |

FOREIGN PATENT DOCUMENTS

| | | |
|---|---|---|
| CA | 2229996 C | 6/2001 |
| CN | 203701284 U | 7/2014 |
| EP | 3012099 A1 | 4/2016 |

OTHER PUBLICATIONS

Extended European Search Report issued in EP21163381.3 dated Jul. 28, 2021.

* cited by examiner

*Primary Examiner* — Tremesha S Willis
(74) *Attorney, Agent, or Firm* — Fox Rothschild LLP; Carol E. Thorstad-Forsyth; Robert J. Sacco

(57) ABSTRACT

Systems and methods for making a structure. The methods comprise: obtaining a composite tube structure; and coupling a tube doubler structure at any point along the composite tube structure. The tube doubler structure comprises a first lamina layer formed of a first material and a second lamina material formed of a second material different than the first material. The combination of the first and second materials provides a tube doubler structure with (i) a bulk bearing strength greater than a bearing strength of the composite tube structure and (ii) hoop and axial bulk Coefficient of Thermal Expansions respectively matching hoop and axial Coefficient of Thermal Expansions of the composite tube structure by a given amount.

34 Claims, 14 Drawing Sheets

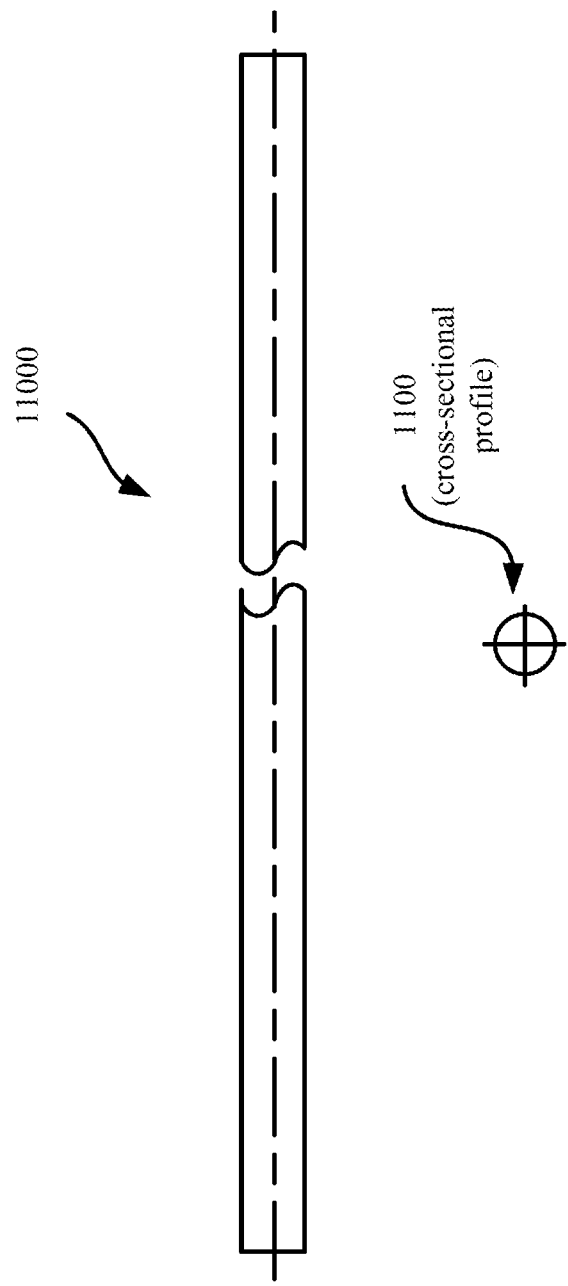

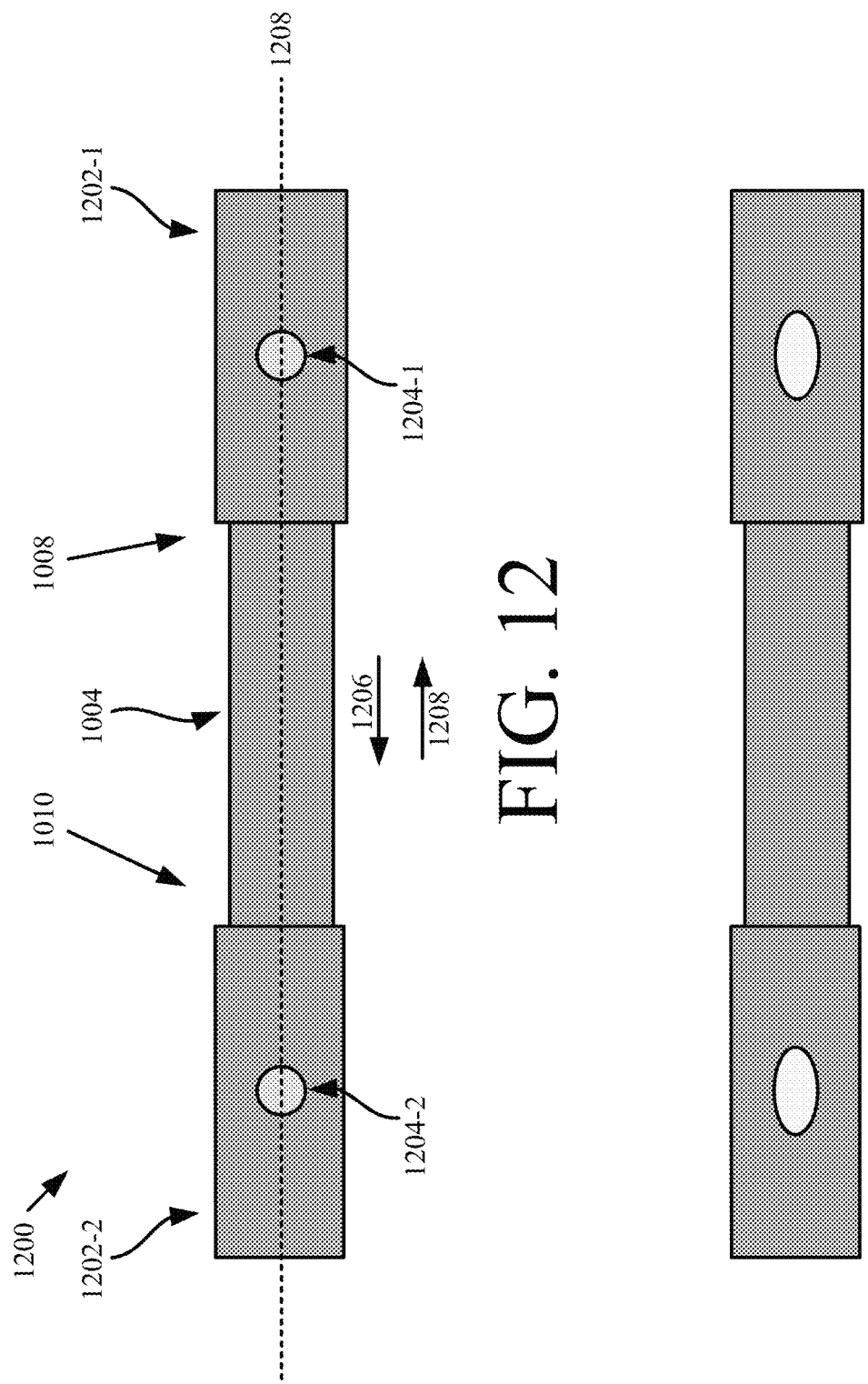

CTE-MATCHED HYBRID TUBE LAMINATE DOUBLER

BACKGROUND

Statement of Technical Field

The present document relates to compact antenna system structures. More particularly, the present document relates to an antenna system structure with a Coefficient of Thermal Expansion ("CTE") matched hybrid tube laminate doubler.

DESCRIPTION OF RELATED ART

Satellites require Radio Frequency ("RF") energy concentrating antennas to provide high gain. These antennas comprise precision parabolic or similar shaped antenna reflectors that are carried into space using launch vehicles. During travel, each precision antenna is stowed in a constrained volume within a launch vehicle. Thus, the precision antenna is designed to be transitioned from a relatively compact stowed position to a fully extended position at the time of its deployment. This transition typically relies on deployable mechanical structures. The deployable mechanical structures are often formed of tubes joined together. Each tube is surrounded by a Multi-Layer Thermal Insulation ("MLI") for protection against a relatively large thermal gradient. Changes in temperature of a surrounding environment causes the tubes to change lengths and/or diameter sizes. The MLI helps prevent or minimize the amount of change in the tube lengths and/or diameters. However, the MLI undesirably adds cost, complexity and weight to the deployable mechanical truss structures.

SUMMARY

This document concerns systems and methods for making a structure. The methods comprise: obtaining a composite tube structure; and coupling a tube doubler structure at any point along (e.g., to at least one end of) the composite tube structure. The tube doubler structure comprises a first lamina layer formed of a first material and a second lamina material formed of a second material different than the first material. The combination of the first and second materials provides a tube doubler structure with (i) a bulk bearing strength greater than a bearing strength of the composite tube structure and (ii) hoop and axial bulk coefficient of thermal expansions respectively matching hoop and axial coefficient of thermal expansions of the composite tube structure by a given amount.

In some scenarios, the first and second lamina layers are co-cured with a plurality of lamina layers used to form the composite tube structure. The first material may comprise a carbon fiber material, and the second different material may comprise a fiberglass material. Alternatively, the first material comprises a first carbon fiber material, and the second material comprises a second carbon fiber material that is different than the first carbon fiber materials.

In those or other scenarios, the hoop bulk coefficient of thermal expansion of the tube doubler structure is different than the axial bulk coefficient of thermal expansion of the tube doubler structure. At least one aperture may be provided that extends through the tube doubler structure and the composite tube structure. The structure is assembled by inserting a pin in the at least one aperture to mechanically couple at least one metallic fitting to the tube doubler structure and the composite tube structure. The tube doubler structure is used to prevent an elongation of the at least one aperture in an axial direction of the composite tube structure by a certain amount as a result of a pulling or pushing force applied to the pin.

In those or other scenarios, the composite tube structure (i) has at least one property that is different in an axial direction than a hoop direction, and (ii) has an axial coefficient of thermal expansion tailored to provide a net zero coefficient of thermal expansion for the composite tube structure. The structure may comprise an antenna truss structure that does or does not form part of an RF antenna.

The present document also concerns an antenna. The antenna comprises: a reflector; and a structure for supporting the reflector. The structure comprises a plurality of tube structures mechanically coupled to metallic fittings. Each of the tube structures is formed of a composite tube structure, and a tube doubler structure coupled at any point along (e.g., to at least one end of) the composite tube structure. The tube doubler structure comprises a first lamina layer formed of a first material and a second lamina material formed of a second material different than the first material. The combination of the first and second materials provides a tube doubler structure with (i) a bulk bearing strength greater than a bearing strength of the composite tube structure and (ii) hoop and axial bulk coefficient of thermal expansions respectively matching hoop and axial coefficient of thermal expansions of the composite tube structure by a given amount.

In some scenarios, the first and second lamina layers are co-cured with a plurality of lamina layers used to form the composite tube structure. The first material may comprise a carbon fiber material, and the second material may comprise a fiberglass material. Alternatively, the first material may comprise a first carbon fiber material, and the second material may comprise a second carbon fiber material that is different than the first carbon fiber material. The hoop bulk Coefficient of Thermal Expansion of the tube doubler structure is different than the axial bulk Coefficient of Thermal Expansion of the tube doubler structure.

In those or other scenarios, at least one aperture is provided that extends through the tube doubler structure and the composite tube structure. The structure also comprises at least one metallic fitting, and a pin that is inserted in the at least one aperture to mechanically couple the at least one metallic fitting to the tube doubler structure and the composite tube structure. The tube doubler is used to prevent an elongation of the at least one aperture in the axial direction of the composite tube structure by a certain amount as a result of a pulling or pushing force applied to the pin.

In those or other scenarios, the composite tube structure (i) has at least one property that is different in an axial direction than a hoop direction, and (ii) has an axial coefficient of thermal expansion tailored to provide a net zero coefficient of thermal expansion for the tube structure. The structure comprises an antenna truss structure that may or not may form part of a Radio Frequency ("RF") antenna.

BRIEF DESCRIPTION OF THE DRAWINGS

This disclosure is facilitated by reference to the following drawing figures, in which like numerals represent like items throughout the figures.

FIG. 11 is an illustration of an illustrative mandrel that may be used to create a composite tube structure.

FIGS. 12-13 each provide an illustration of a composite tube structure with a tube doubler disposed at each end.

DETAILED DESCRIPTION

Figure 1:
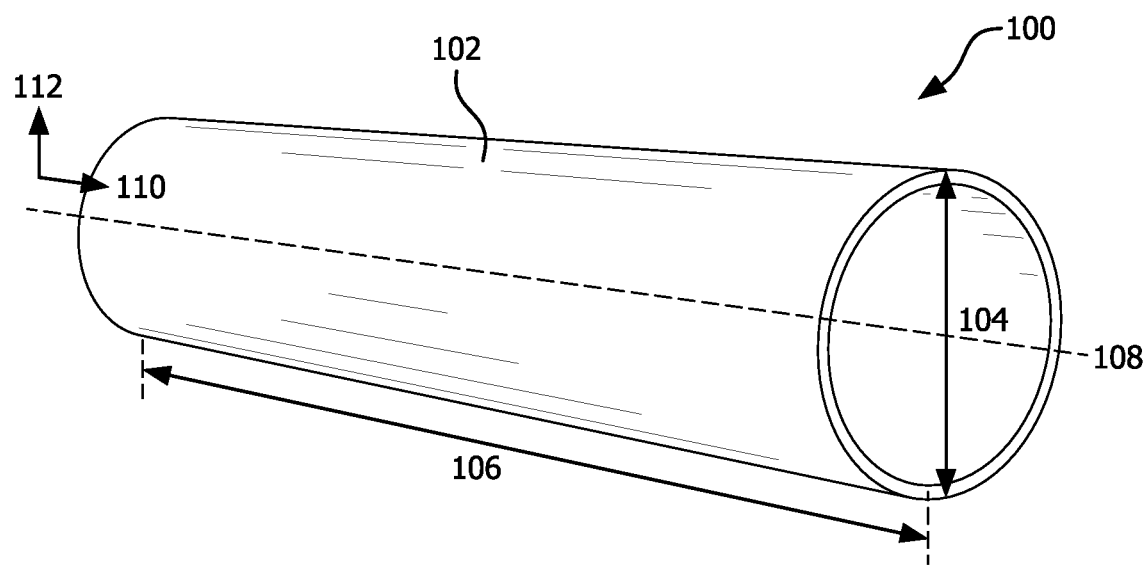
FIG. 1 is a perspective view of an illustrative composite tube structure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As noted above, satellites require RF energy concentrating antennas to provide high gain. These antennas comprise precision parabolic or similar shaped antenna reflectors that are carried into space using launch vehicles. During travel, each precision antenna is stowed in a constrained volume within a launch vehicle. Thus, the precision antenna is designed to be transitioned from a relatively compact stowed position to a fully extended position at the time of its deployment. This transition typically relies on deployable mechanical truss structures. The deployable mechanical truss structures are often formed of tubes movably joined together. Changes in temperature of a surrounding environment causes the tubes to change lengths and/or diameter sizes, which negatively affects antenna performance since the tension applied to the reflector surface increased or decreased with the changes in tube size. Thus, each tube is surrounded by one or more layers of MLI for protection against a relatively large thermal gradient. Although the MLI helps prevent or minimize the amount of change in the tube lengths and/or diameters, it undesirably adds cost, complexity and weight to the deployable mechanical truss structures.

The word "monolithic" is used herein when referring to curing multiple distinct lamina layers together into a conglomerate structure. A phrase "monolithic hybrid laminate composite tube" is used herein to refer to a cure of lamina layers. The phrase "hybrid laminate composite tube" and/or "hybrid laminate composite tube structure" is(are) used herein to refer to a laminate design, materials and/or orientations. The phrase "composite tube" and/or "composite tube structure" is(are) used herein to refer to a tube as a whole. The term "laminate" refers to all the layers together as a single monolithic structure. The term "lamina" refers to an individual layer of the laminate either before or after cure.

Hybrid Laminate Composite Tube Structure

The present solution provides a hybrid laminate composite tube structure that can be used to form a variety of larger structures. For example, the hybrid laminate composite tube structure is used to form a deployable mechanical truss structure for space-based applications which do not require outer layers of MLI. The hybrid laminate composite tube structure is formed of a material that has a zero axial CTE or a near zero axial CTE. As such, the hybrid laminate composite tube structure experiences no change or a relatively small amount of change with regard to its elongate length when subjected to extreme temperature changes in a space environment. The present solution is not limited to the particulars of this example.

Figure 2:
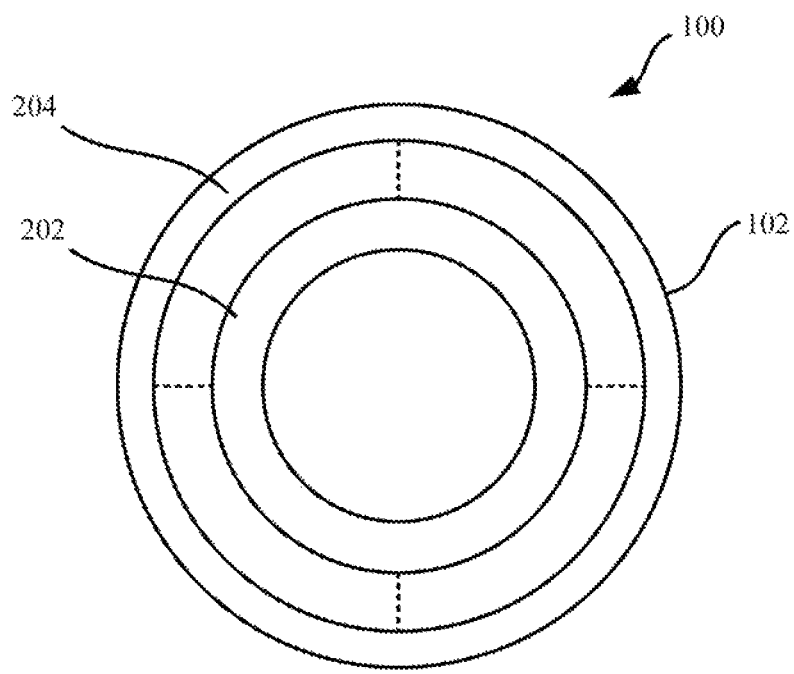
FIG. 2 is a cross section view of the composite tube structure shown in FIG. 1.

Referring now to FIGS. 1-2, there are provided illustrations of a monolithic composite tube structure 100. The monolithic composite tube structure 100 comprises an elongate cylindrical hollow body 102. Body 102 has an elongate length 106 that extends along a central elongate axis 108. The body 102 also has a diameter 104. The body 102 is formed of a hybrid component structure that contains a plurality of laminated layers 202, . . . , 204.

The laminated layers 202, . . . , 204 include fibers of the same or at least two different types (e.g., at least one layer containing first fibers formed of carbon and at least one second layer containing second fibers formed of boron, tungsten, titanium, and/or fiberglass). The fibers of each laminated layer can point or extend in (a) a direction that is parallel to or angled 0° relative to the central elongate axis 108 (e.g., $\alpha=0°$) or (b) a direction that is angled relative to the central elongate axis 108 (e.g., $0°<+\alpha<+90°$ or $-90°<-\alpha<0°$). However, more than fifty percent of the laminated layers may have fibers that extend in an axial direction 110 (i.e., $\alpha=0°$), and less than fifty percent of the laminated layers may have fibers that extend in a direction angled relative to the central elongate axis 108 of the monolithic composite tube structure 100 (e.g., $0°<+\alpha<+90°$ or $-90°<-\alpha<0°$).

Figure 9:
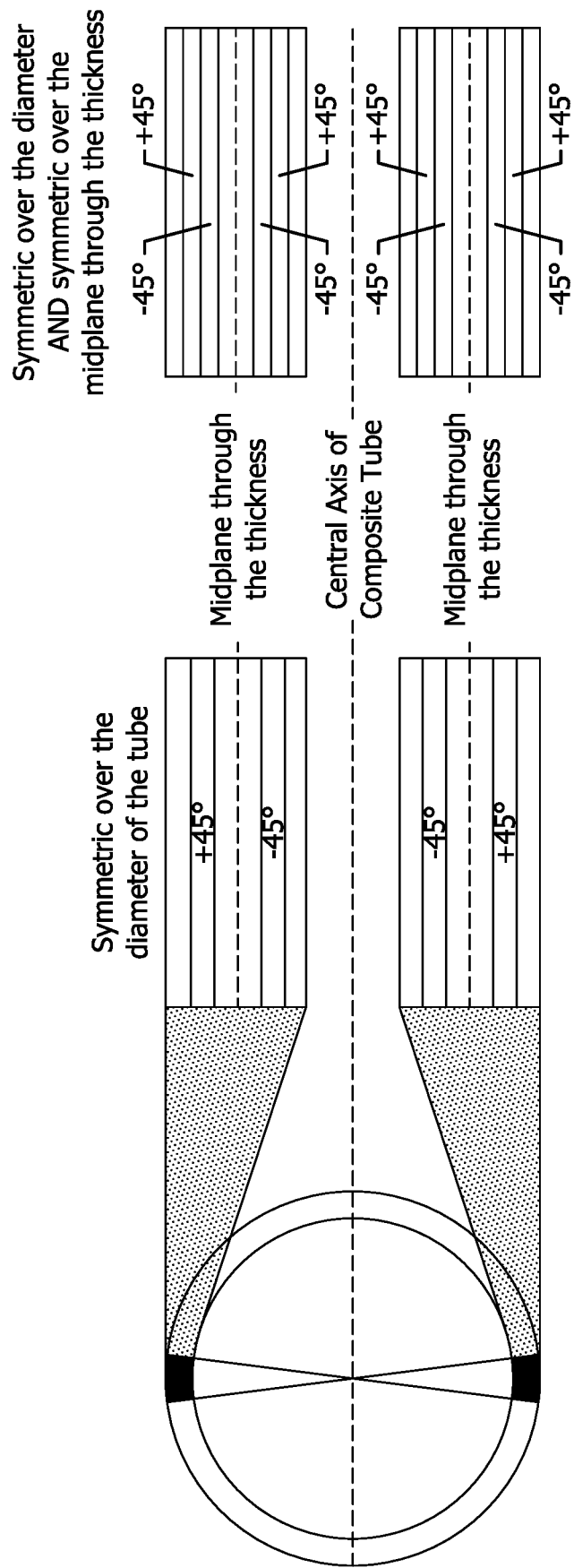
FIG. 9 provides an illustration that is useful for understanding a difference between symmetry across a diameter of a tube versus symmetry through a thickness of the tube.

The laminated layers 202, . . . , 204 are arranged concentrically. This ensures that the fiber angles $\alpha$ are symmetric over a diameter 104 of the tube 100. Notably, the fiber angles $\alpha$ of the laminated layers 202, . . . , 204 are not symmetric over the midplane through the thickness of the hybrid laminate. This means that the total fiber angle value of layer(s) above a middle layer is different than the total fiber angle value of layer(s) below the middle layer. This feature distinguishes the present solution from conventional flat laminates which have fibers symmetrically positioned about the midplane or through the thickness of the laminate material. FIG. 9 provides an illustration showing a difference between symmetry across a diameter of a tube versus symmetry through a thickness of the tube.

The hybrid component material of the tube structure 100 has at least one property that is different in an axial direction 110 (i.e., a direction that extends parallel to a central elongate axis 108 of the tube) and a hoop or transverse direction 112 (i.e., a direction that extends perpendicular to the central elongate axis 108 of the tube). The properties include, but are not limited to, a CTE, a stiffness, and/or a strength. In this regard, the present solution distinguishes from conventional flat panel hybrid laminates since the present solution is not isotropic or quasi-isotropic. The term "isotropic" means the same properties in all directions. The term "quasi-isotropic" means the same properties in at least two directions. In flat materials, the two directions include an x-axis (or 0°) direction (corresponding to the axial direction 110 of a tube) and a y-axis (or 90°) direction (corresponding to the transverse hoop direction 112 of a tube).

The hybrid composite laminate is formed of two or more different composite materials combined together to tailor a CTE of the tube so as to arrive at a zero axial CTE or a near zero axial CTE. The axial CTE is the CTE that indicates how much the length 106 of the tube 100 is going to expand and contract in an axial direction 110 when subjected to temperature changes. In space-based antenna applications, the zero axial CTE and/or near zero axial CTE negate(s) the negative system performance that is caused by the relatively large temperature extremes of a surrounding environment.

In some scenarios, the two different types of fibers contained in the hybrid composite laminate are selected to include (a) a first type of fibers that have a negative axial CTE whereby the fibers shrink in size when exposed to increased temperatures and (b) a second type of fibers that have a positive axial CTE whereby the fibers expand or elongate when exposed to increased temperatures. When the negative CTE constituent is combined with the positive CTE constituent in the single monolithic laminate, a net CTE is produced. The net CTE comprises a weighted average CTE of the two constituents. Accordingly, the hybrid component material of tube structure 100 comprises a ratio of negative axial CTE constituent(s) to positive axial CTE constituent(s) that provides a weighted average CTE that results in a zero axial CTE or a near zero axial CTE. The weighted average CTE is a function of ply CTEs, ply thicknesses, total number of plys, and ply fiber angle. Such a function may be defined by classical lamination theory which is well known in the art. The ratio of the first type of fibers to the second type of fibers is controlled by the total number of constituents, the total number of constituent layers, and/or the layer thicknesses. The hybrid component material of tube structure 100 can have any number of constituents greater than or equal to two, any number of constituent layers, and/or any layer thicknesses. These characteristics of the plys are selected in accordance with a given application so as to provide a laminate material with a zero axial CTE or a near zero axial CTE. As noted above, the weighted average CTE also depends on the ply fiber angles, i.e., the fiber directions relative to the central elongate axis 108 of the composite tube structure 100. The ply fiber angles can all be zero relative to a central elongate axis 108 of the composite tube structure (i.e., have zero ply fiber angles $\alpha=0°$), can all be non-zero relative to the central elongate axis 108 of the composite tube structure (i.e., have non-zero ply fiber angles $\alpha\neq0°$), or can comprise a combination of zero and non-zero ply fiber angles. As such, the CTE of the present hybrid component material can be controlled by: altering the ratio of the first type of fibers to the second type of fibers; and/or altering the angle(s) of non-axial ply layer(s).

The tube structure also has a hoop CTE which indicates how much the tube's diameter 104 is going to expand and contract in a hoop or transverse direction 112. The hoop CTE is a non-zero CTE that is different than the axial CTE. In some scenarios, the hoop CTE of the tube structure 100 is tailored to match a CTE of a material that the tube interfaces with when used to form a larger structure (e.g., a deployable antenna truss structure). For example, the hoop CTE of the tube structure 100 is matched to a CTE of a metal end fitting used to couple the tube 100 to another tube. This CTE matching reduces thermal stress in the tube structure 100. The tube structure 100 may also have an axial CTE tailored to provide a net zero CTE for an assembled structure (e.g., a deployable antenna truss structure). The present solution is not limited in this regard.

Figure 3:
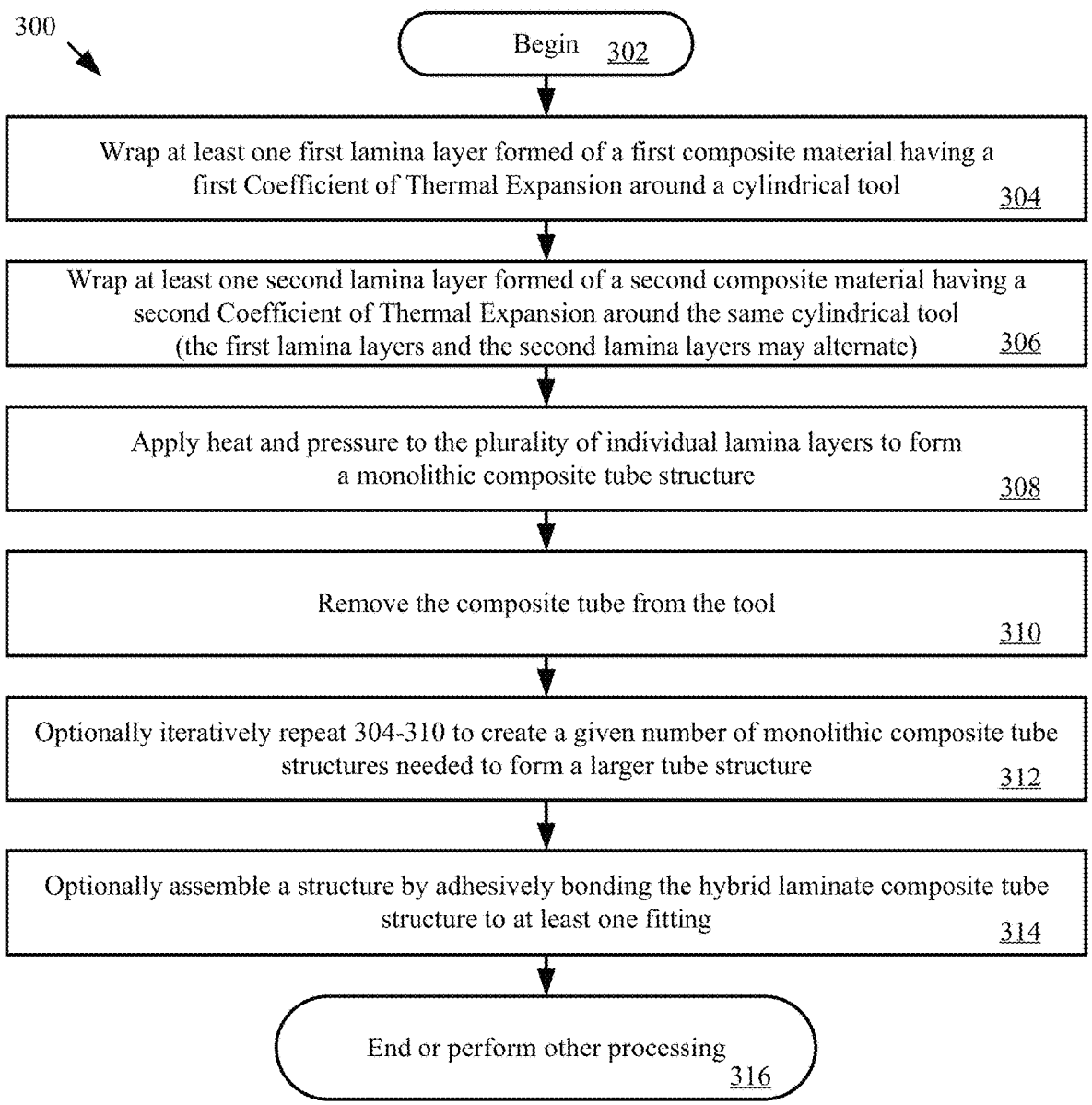
FIG. 3 is a flow diagram of an illustrative method for making a composite tube structure.

Referring now to FIG. 3, there is provided a flow diagram of an illustrative method 300 for making a monolithic tube structure (e.g., monolithic tube structure 100 of FIG. 1). Method 300 begins with 302 and continues with 304 where at least one first lamina layer is wrapped around a cylindrical tool (e.g., a non-tapered male cylindrical mandrel which may be made of metal). The first lamina layer is formed of a first composite material that has a first CTE. Next in 306, at least one second lamina layer is wrapped around the cylindrical tool. The second lamina layer is formed of a second composite material that is different from the first composite layer and has a second CTE that is different than the first CTE. The first lamina layers and the second lamina layers may alternate.

In 308, heat and pressure are applied to the plurality of individual lamina layers. The heat and pressure can be applied using a vacuum bag and an autoclave. Vacuum bags and/or autoclaves are well known in the art, and therefore will not be described herein. A monolithic composite tube structure is formed through the application of heat and pressure in 308. In this regard, it should be noted that resins of the first and second lamina layers flow when the heat and pressure are applied thereto. Polymers of the resins link together so as to couple the first and second lamina layers to each other. The monolithic tube structure has: at least one property that is different in the axial direction (e.g., axial direction 110 of FIG. 1) and the hoop direction (e.g., hoop direction 112 of FIG. 1); an axial CTE tailored to provide a net zero CTE for an assembled structure; and/or a hoop CTE tailored to match the CTE of a fitting in the hoop direction so as to reduce thermal stress in the monolithic tube structure. In some scenarios, more than fifty percent of the first and second lamina layers have fibers extending in the axial direction, and less than fifty percent of the first and second layers have fibers extending in a direction that is angled relative to the central elongate axis (e.g., central elongate axis 108 of FIG. 1) of the monolithic tube structure. The composite tube structure is removed from the cylindrical tool in 310.

The process of 304-310 can be optionally iteratively repeated to create any given number of monolithic composite tube structures needed to form a larger tube structure (e.g., an antenna truss structure).

Method 300 may continue with optional 314. In 314, a structure is assembled by adhesively bonding the monolithic tube structure to at least one fitting (e.g., a metallic fitting forming a joint between two or more monolithic tube structures). In some scenario, the structure comprises an antenna or an antenna truss structure. The fitting can include, but is not limited to, an end fitting for a tube structure. Adhesives are well known in the art, and therefore will not be described herein. Any known or to be known adhesive can be used herein without limitation. As noted above, an axial CTE of the monolithic tube structure is tailored to provide a net zero CTE for the assembled structure. The tailoring can involve changing ply angles, ply thicknesses, ratios of positive CTE constituents to negative CTE constituents, and/or the type(s) of fiber(s) contained in each layer of the composite material. Additionally, a hoop CTE of the monolithic tube structure is tailored to match the CTE of the fitting in the hoop direction so as to reduce thermal stress in the monolithic tube structure. This type of matching can be achieved by changing ply angles, ply thicknesses, ratios of positive CTE constituents to negative CTE constituents, and/or the type(s) of fiber(s) contained in each layer of the composite material. Subsequently, 316 is performed where method 300 ends or other processing is performed.

The following EXAMPLES are provided to illustrate certain embodiments of the present solution. The following EXAMPLES are not intended to limit the present solution in any way.

Example 1

A composite tube structure is formed of a laminate material. The laminate material is created in accordance with the above described process 300. The particulars of the laminate material are illustrated in the following TABLE 1.

TABLE 1

| Ply # | CTE | Thickness | Angle |
|---|---|---|---|
| 1 | $CTE_1$ | $th_1$ | 0.00 |
| 2 | $CTE_2$ | $th_2$ | 0.00 |
| 3 | $CTE_1$ | $th_1$ or $th_3$ | $0.00 < +\alpha < +90.00$, or $0.00 < -\alpha < -90.00$ |

As shown in TABLE 1, the laminate material comprises three laminated layers. The first and third layers are formed of a material having a first coefficient of thermal expansion $CTE_1$. The second or middle layer is formed of a material having a second coefficient of thermal expansion $CTE_2$. The second coefficient of thermal expansion $CTE_2$ is different from the first coefficient of thermal expansion $CTE_1$. The three laminated layers are selected to have properties and relative arrangements that provide a tube structure with a zero axial CTE or a near zero axial CTE.

In some scenarios, the first and third layers are formed of a prepreg material containing fibers of a first type, and the second layer is formed of a prepreg material containing fibers of a second type. The second type is different than the first type. For example, in some scenarios, the first type of fibers is a non-metal type of fibers (e.g., carbon fibers), and the second type of fibers is a metal type of fibers (e.g., boron, tungsten or titanium). In other scenarios, the first type of fibers is a metal type of fibers, and the second type of fibers is a non-metal type of fibers. In other scenarios, the first type of fibers is a first non-metal type of fibers, and the second type of fibers is a second non-metal type of fibers. Yet in other scenarios, the first type of fibers is a first metal type of fibers, and the second type of fibers is a second metal type of fibers. The present solution is not limited to the particulars of these scenarios.

The first and third layers have the same or different cure ply thickness. Accordingly in some scenarios, the first and third layers have the same thickness $th_1$. But in other scenarios, the first layer has a thickness of $th_1$ and the third layer has a thickness of $th_3$. The second or middle layer has a thickness the that is different than the thicknesses of the first and third layers.

Each of the three layers contains a plurality of fibers that extend parallel to each other. The first and second layers are arranged so that the fibers thereof extend parallel relative to the central elongate axis (e.g., central elongate axis 108 of FIG. 1) of the composite tube. Such an arrangement of the first and second layers provides stiffness down the central elongate axis of the composite tube.

The third layer is arranged so that the fibers thereof extend in a direction that is angled relative to the central elongate axis of the monolithic composite tube structure (e.g., angled by) ±1-89°. In order to provide the angled relationship between third layer's fiber direction and the central elongate axis direction, the material spirals down the length of the tube in a first direction (e.g., a clockwise direction or counterclockwise direction). Such an arrangement of the third layer provides transverse strength and stiffness of the composite tube structure (i.e., strength and stiffness in the hoop direction 112 of FIG. 1).

The axial CTE of the composite tube structure formed of the above described laminate material is tailored by: altering the angle of the non-axial ply layer (i.e., the third layer); and/or altering the ratio of the second type of fibers to the first type of fibers.

Example 2

A composite tube structure is formed of a laminate material. The laminate material is created in accordance with the above described process 300. The particulars of the laminate material are illustrated in the following TABLE 2.

TABLE 2

| Ply # | Prepreg Material Type | Thickness (mils) | Angle |
|---|---|---|---|
| 1 | Carbon Fibers/Resin | 2.5 | 0.00 |
| 2 | Carbon Fibers/Resin | 2.5 | 0.00 |

TABLE 2-continued

| Ply # | Prepreg Material Type | Thickness (mils) | Angle |
|---|---|---|---|
| 3 | Carbon Fibers/Resin | 2.5 | +45.00 or +54.00 |
| 4 | Carbon Fiber/Resin | 2.5 | 0.00 |
| 5 | Boron Fibers/Resin | 4.0 | 0.00 |
| 6 | Carbon Fibers/Resin | 2.5 | 0.00 |
| 7 | Carbon Fibers/Resin | 2.5 | −45.00 or −54.00 |
| 8 | Carbon Fibers/Resin | 2.5 | 0.00 |
| 9 | Carbon Fibers/Resin | 2.5 | 0.00 |

As shown in TABLE 2, the laminate material comprises nine laminated layers. Layers 1-4 and 6-9 comprise a prepreg tape formed of carbon fibers and a resin, and have a cured ply thickness of 2.5 mils. The midplane layer 5 comprises a prepreg tape formed of boron fibers and a resin, and has a cured ply thickness of 4.0 mils. The carbon fibers can include, but are not limited to, M55J carbon fibers available from Toray Composite Materials America, Inc. of Tacoma, Wash. The boron fibers can include, but is not limited to, boron coated tungsten wires from Specialty Materials of Lowell, Mass. The resin of layers 1-9 can include, but is not limited to, an RS-3 resin available from Toray Composite Materials America, Inc. of Tacoma, Wash.

Notably, the carbon fibers have a negative axial CTE such that they will shrink in size when exposed to increased temperatures. In contrast, the boron fibers have a positive axial CTE so that they will expand or elongate when exposed to increased temperatures. When the negative CTE constituent is combined with the positive CTE constituent in a single monolithic laminate, a net CTE is provided (e.g., a weighted average CTE of the two constituents) that comprises a zero axial CTE or a near zero axial CTE.

Each of the nine layers contains a plurality of fibers that extend parallel to each other. Layers 1, 2, 4-6, 8 and 9 are arranged so that the fibers thereof extend parallel relative to the central elongate axis (e.g., central elongate axis 108 of FIG. 1) of the composite tube structure. Such an arrangement of the layers 1, 2, 4-6, 8 and 9 provides stiffness and strength down the central elongate axis of the composite tube structure. The stiffness and strength in the axial direction (e.g., direction 110 of FIG. 1) can be decreased by removing some of the layers containing fibers that extend parallel relative to the central elongate axis, and can be increased by adding more layers containing fibers that extend parallel relative to the central elongate axis.

Layers 3 and 7 are arranged so that the fibers thereof extend in a direction that is angled relative to the central elongate axis of the hybrid laminate composite tube structure (e.g., angled by ±45° or 54°). In order to provide the positive angled relationship between the third layer's fiber direction and the central elongate axis direction, the prepreg tape spirals down the length of the tube in a first direction (e.g., a clockwise direction). In order to provide the negative angled relationship between seventh layer's fiber direction and the central elongate axis direction, the prepreg tape spirals down the length of the tube in a second direction (e.g., a counter clockwise or anticlockwise direction) opposed from the first direction. Such an arrangement of the third and seventh layers provide transverse strength and stiffness of the hybrid laminate composite tube structure (i.e., strength and stiffness in the hoop direction 112 of FIG. 1).

The axial CTE of the hybrid laminate composite tube structure formed of the above described laminate material is tailored by: altering the angle of the non-axial ply layers (i.e., the third and seventh layers); and/or altering the ratio of the boron to carbon.

Figure 4:
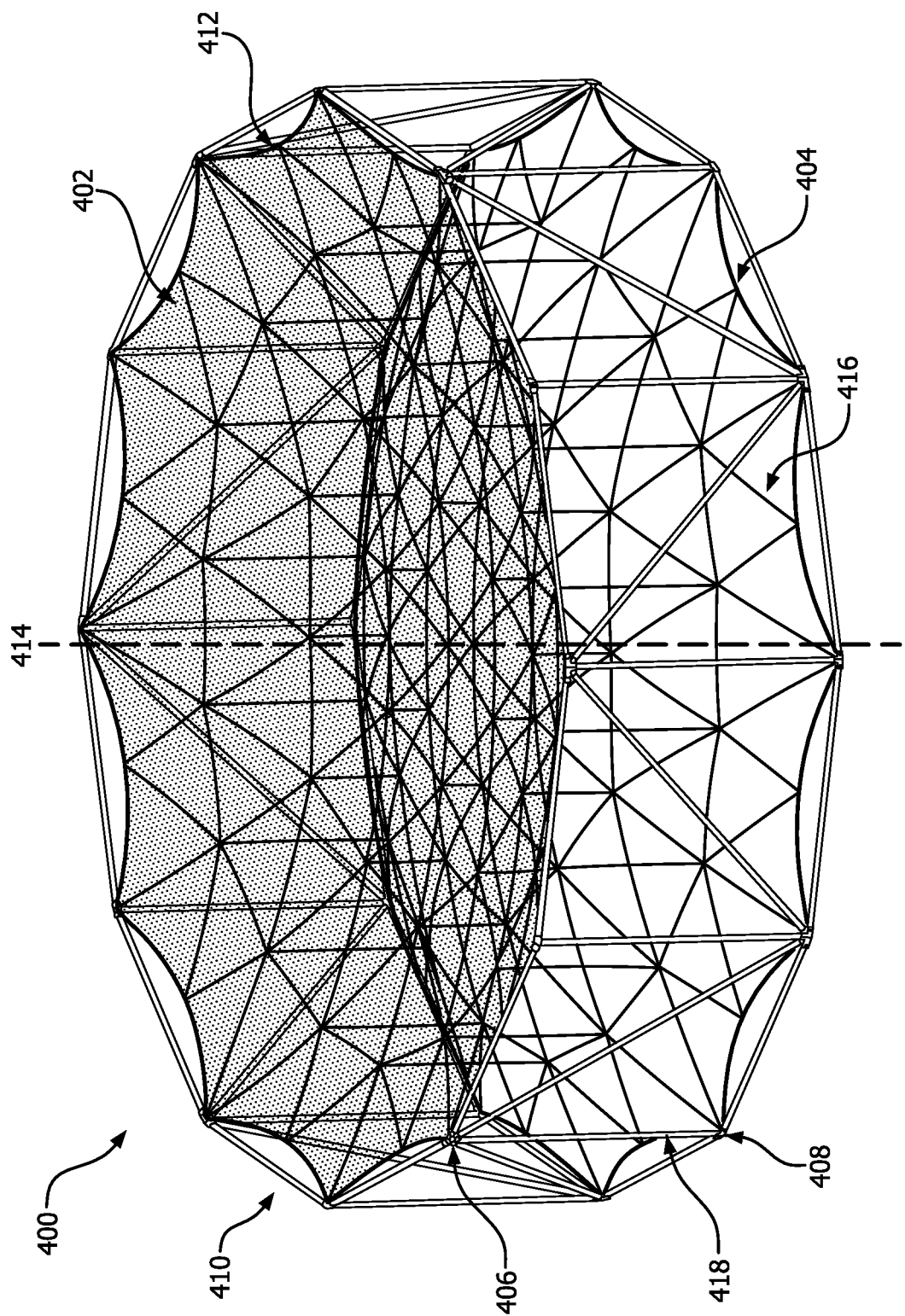
FIG. 4 is a perspective view of an extendable reflector in a fully extended position.
Figure 5:
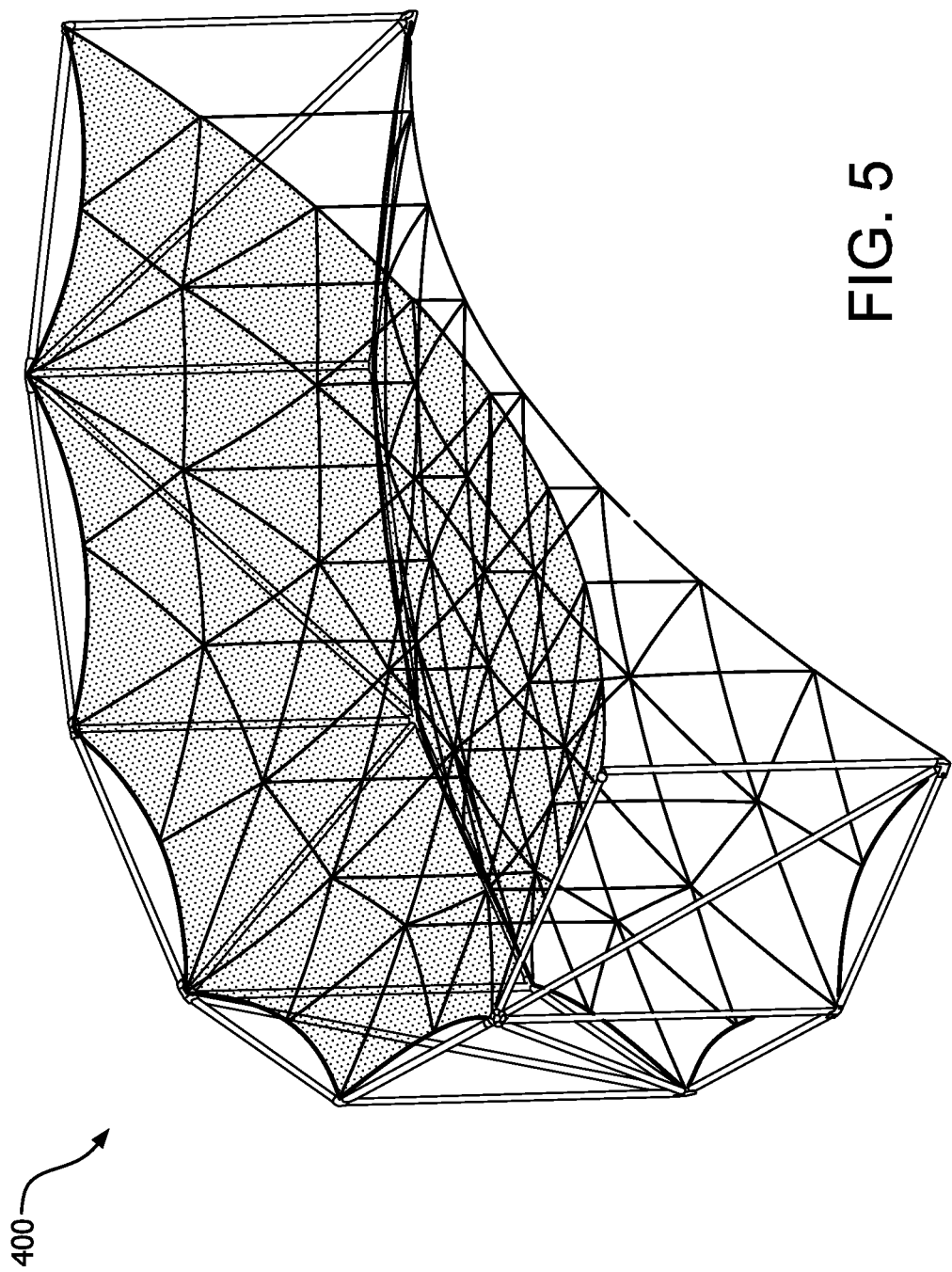
FIG. 5 is a cross-sectional view of the extendable reflector shown in FIG. 1.

Referring now to FIGS. 4-8, there are provided illustrations of an illustrative extendable reflector structure 400 implementing the present solution. The extendable reflector structure 400 has an appearance that is similar to a conventional radial perimeter truss reflector. In general, the deployable reflector structure 400 has a circular, parabolic shape when it is in its fully extended position as shown in FIG. 4. The deployable reflector structure 400 includes the flexible antenna reflector surface 402, the surface shaping (or tension) cord network 404, and a support structure 410. The support structure 410 is also referred to herein an antenna truss structure or a perimeter hoop structure.

The reflector surface 402 is formed from any material that is suitable as an antenna's reflective surface. Such materials include, but are not limited to, reflective wire knit mesh materials similar to light weight knit fabrics. In its fully extended position shown in FIG. 4, the reflector surface 402 has a size and shape selected for directing RF energy into a desired pattern. For example, the reflector surface 402 has a scalloped cup shape with concave peripheral edge portions 412. The present solution is not limited in this regard.

The reflector surface 402 extends around a central longitudinal axis 414 of the extendable reflector structure 400. As such, the reflector surface 402 may be a curve symmetrically rotated about the central longitudinal axis 414, a paraboloid rotated around an offset and inclined axis, or a surface shaped to focus the RF signal in a non-symmetric pattern.

The reflector surface 402 is fastened to the support structure 410 via the surface shaping cord network 404. The surface shaping cord network 404 supports the reflector surface 402 creating a parabolic shape. The reflector surface 402 is dominantly shaped by the surface shaping cord network 404.

The surface shaping cord network 404 defines and maintains the shape of the reflector surface 402 when in use. In this regard, the surface shaping cord network 404 includes a plurality of interconnected cords (or thread like strings) 416. The cords 416 are positioned between the reflector surface 402 and the support structure 410 so as to provide structural stiffness to the reflector surface 402 when the perimeter truss antenna is in use.

When the extendable reflector structure 400 is in its fully deployed configuration, the surface shaping cord network 404 is a stable structure under tension. The tension is achieved by applying pulling forces to the cords by means the support structure 410.

Figure 6:
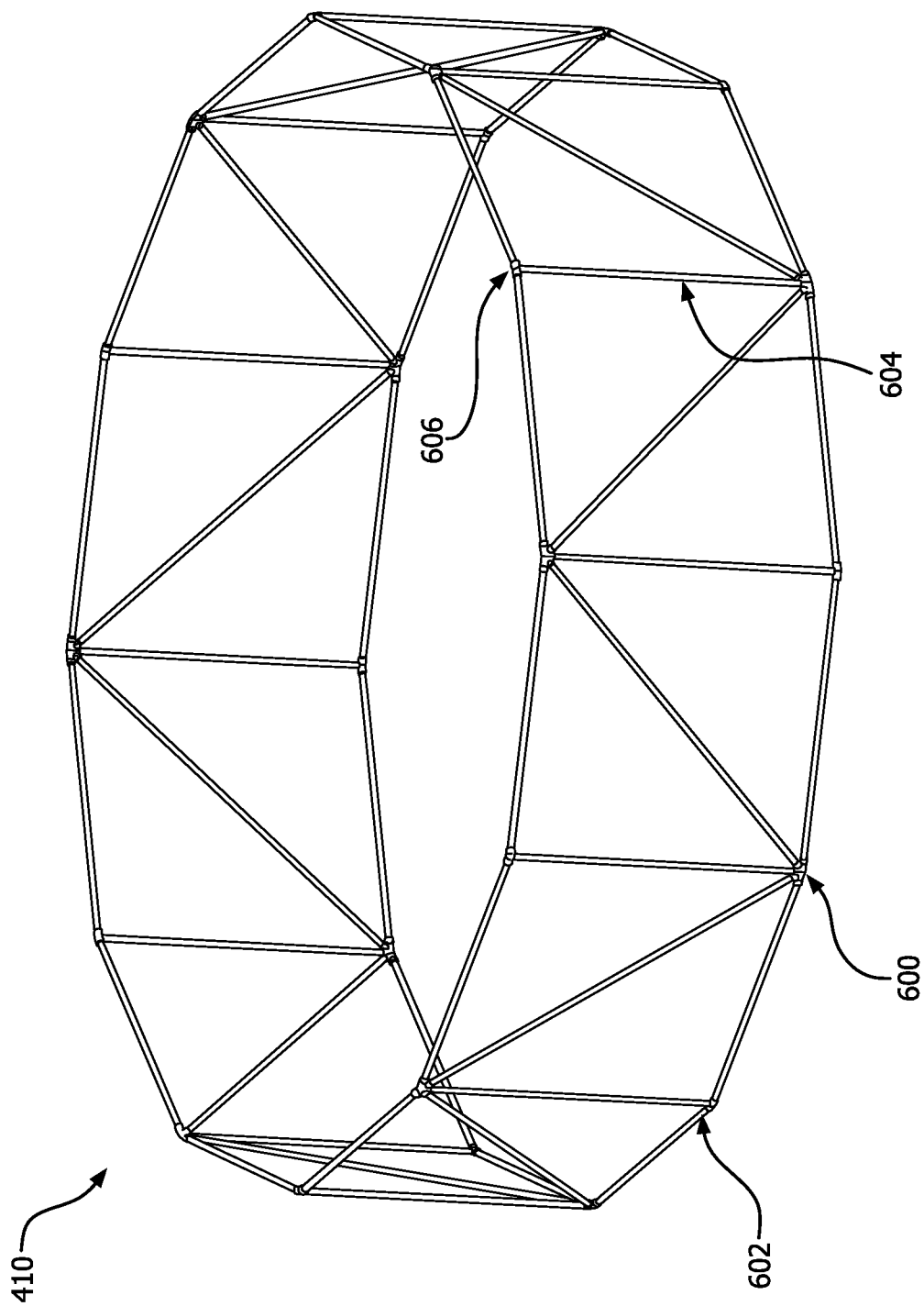
FIG. 6 is a perspective view of a perimeter hoop structure of the extendable reflector in a fully extended position.
Figure 7:
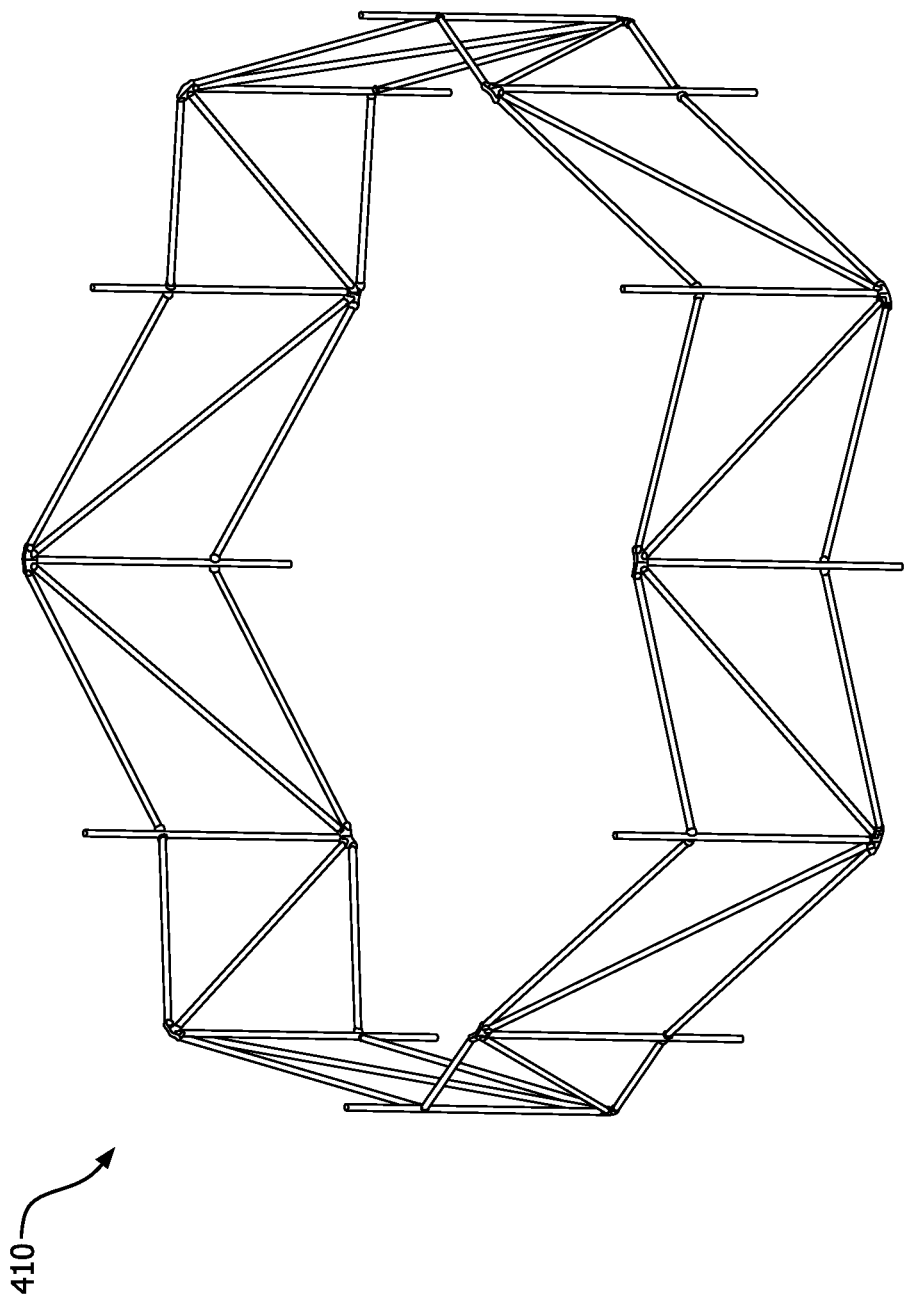
FIG. 7 is a perspective view of the perimeter hoop structure in a partially extended position.
Figure 8:
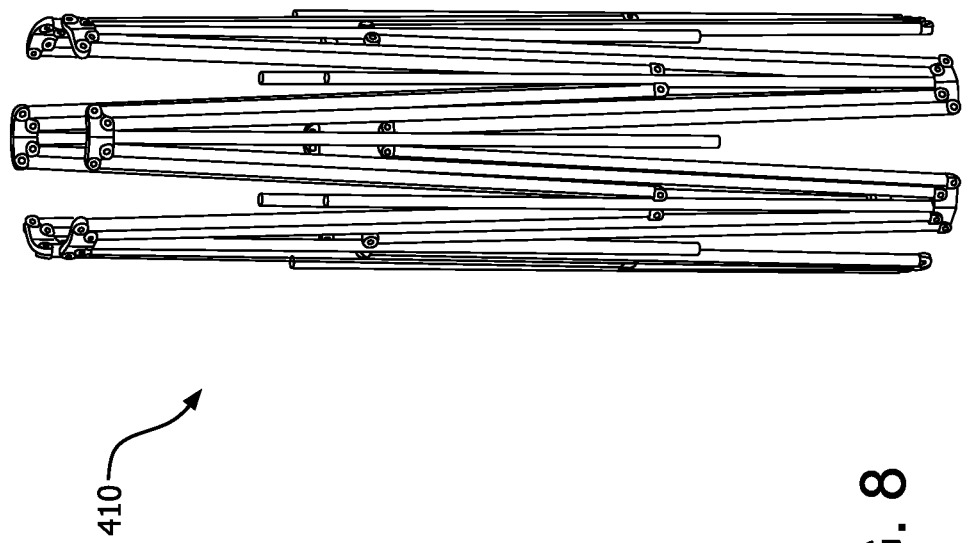
FIG. 8 is a perspective view of the perimeter hoop structure in the fully stowed position or a non-extended position.

The support structure 410 is a foldable structure that can be transitioned from a fully stored or non-extended position shown in FIG. 8 to a fully extended position shown in FIG. 6. A partially extended position of the support structure 410 is shown in FIG. 7. The support structure 410 is formed of a plurality of rigid battens 418 that are coupled to each other via joint mechanisms 600, 602. Joint mechanisms 600 simply allow battens to bend into and away from adjacent battens as shown in FIG. 7. In contrast, joint mechanisms 602 allow battens to move away from and towards adjacent battens, as well as allow horizontal battens 604 to slide therethrough as also shown in FIG. 7.

The rigid battens 418 are formed of a plurality of hybrid laminate composite tube structures. The monolithic composite tube structures used here from battens 418 are the same as or similar to the monolithic composite tube structure 100 of FIGS. 1-2. As such, the discussion provided above in relation to the monolithic composite tube structure 100 is sufficient for understanding the rigid battens 418. Notably, a hoop CTE of the rigid battens 418 is matched to a CTE of a material of the joints 406, 408 that the battens interface with when used to form the support structure 410.

Figure 10:
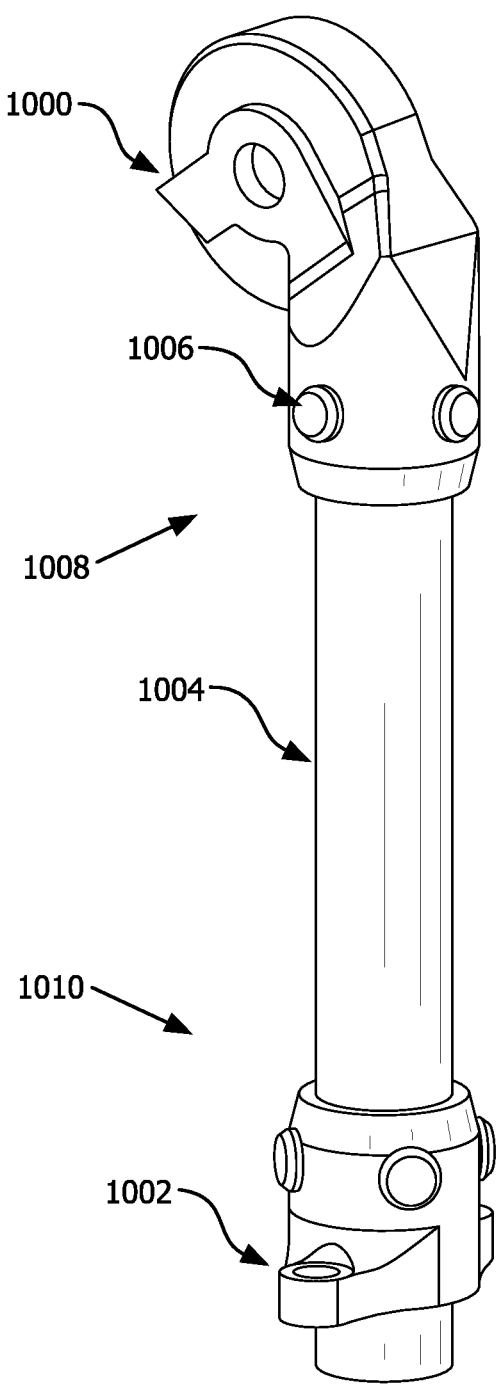
FIG. 10 is an illustration of an illustrative fittings coupled to a composite tube structure.

Referring now to FIG. 10, there is provided an illustrative of illustrative fittings 1000, 1002 coupled to a composite tube structure 1004. The fittings 1000, 1002 may be formed of metal. The fittings 1000, 1002 are coupled to the composite tube structure 1004 via an adhesive and/or other coupling means (e.g., screws, nuts, bolts, clamps, snap-fit couplers, etc.). The fitting 1000 includes, but is not limited to, a fitting having a part number 3289928-001 (fitting, pivot, guide) and being is available from Proto Labs, Inc. of Minnesota. The fitting 1002 includes, but is not limited to, a fitting having a part number 3289925-001 (fitting, latch, tension tube) and being available from Proto Labs, Inc. of Minnesota. The composite tube structure 1004 is the same as or similar to composite tube structure 100. As such, the above discussion of composite tube structure 100 is sufficient for understanding composite tube structure 1004.

Referring now to FIG. 11, there is provided an illustration of an illustrative mandrel 1100 that can be used to create a composite tube structure in accordance with the present solution. The mandrel 1100 includes, but is not limited to, a mandrel having a part number 23199-0021 (PT Mandrel, $\%_{25}$") and being available from Convertech of New Jersey.

Tube Doubler

As noted above, there is a desire for space antennas to operate without MLI. Space structures without MLI experience larger thermal extremes, which can cause failure in adhesively bonded joints of composite tubes to metallic fittings. Thus, the present solution uses pins 1006 or other mechanical couplers to provide space antennas with mechanical, non-bonded joints as discussed above and shown FIG. 10.

However, the above-described hybrid tube laminate may experience damage as a result of structural strain caused, for example, by pin/hole shearing. Therefore, the present solution provides a tube doubler structure that is optimized for high bearing strength. A tube doubler structure can be disposed on one or more opposing ends 1008, 1010 of the composite tube structure 1004 (discussed above in relation to FIGS. 1-11). Each tube doubler structure comprises two or more cured lamina layers. The lamina layers used to form the tube doubler can be disposed on and co-cured with the lamina layers used to form the composite tube structure 1004.

Notably, the tube doubler structure of the present solution is superior to conventional tube doubler structures. In this regard, it should be understood that the tube doubler structure of the present solution comprises at least a first lamina layer formed of a first material and a second lamina material formed of a second material different than the first material, where the combination of the first and second materials provides a tube doubler structure with (i) a bulk bearing strength greater than a bearing strength of the composite tube structure 1004 and (ii) hoop and axial bulk CTEs respectively matching hoop and axial CTEs of the composite tube structure by a given amount. This is not the case in conventional tube doubler solutions which only comprise feature (i) or feature (ii), but not both features (i) and (ii). For example, some conventional tube doubler structures are formed of the same material as the underlying tube structure, and therefore do not comprise feature (i) since they have the same bearing strength as the underlying tube structure. Other conventional tube doubler structures are formed of a single material that is different than the material of the underlying tube structure. However in these scenarios, the second feature (ii) is not present in the conventional tube doubler structures because the tube doubler structures have CTEs that are not matched to the CTEs of the underlying tube structure by the given amount. In the present case, both composite materials of the tube doubler may be different than the material(s) used to form the underlying composite tube structure but are selected such that when combined together features (i) and (ii) are both provided in the resulting tube doubler structure.

Figure 16:
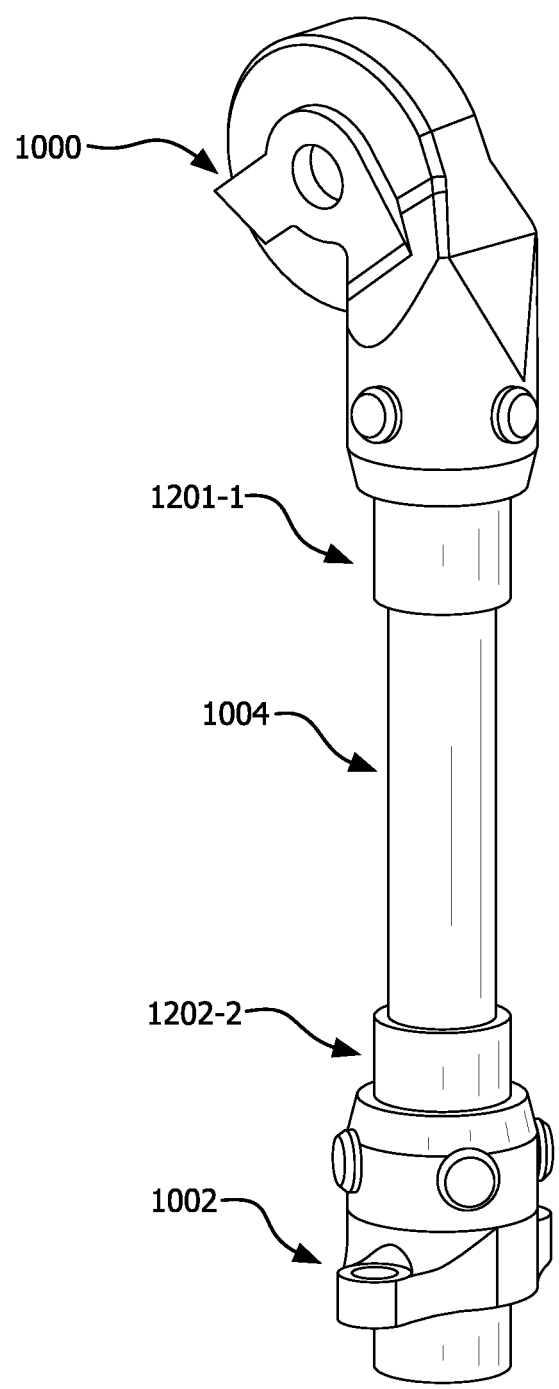
FIG. 16 is an illustration of an illustrative fittings coupled to the tube structure shown in FIG. 12.

An illustration is provided in FIG. 12 that shows a first tube doubler 1202-1 disposed on a first end 1008 of composite tube structure 1004 and a second tube doubler 1202-2 disposed on a second end 1010 of composite tube structure 1004. A first aperture 1204-1 is formed through the first tube doubler 1202-1 and the first end 1008 of the composite tube structure 1004. A second aperture 1204-2 is formed through the second tube doubler 1202-2 and the second end 1010 of the composite tube structure 1004. The first and second apertures 1204-1, 1204-2 are sized and shaped to receive a pin 1006 or other mechanical coupler (e.g., screw) for securing the tube structure 1200 to fittings 1000, 1002, as shown in FIG. 16.

During use, the tube structure 1200 may be pulled and pushed in opposing axial directions 1206, 1208 of the composite tube structure 1004. This pulling/pushing of the tube structure 1200 can cause an enlargement or elongation of apertures 1204-1, 1204-2 in an axial direction of the composite tube structure, as shown in FIG. 13. The enlargement/elongation of apertures 1204-1, 1204-2 is undesirable in some applications such as antenna applications. In antenna applications, it should be appreciated that the enlargement/elongation of apertures 1204-1, 1204-2 causes a change or increase in the effective length of the tube structure 1200. Consequently, a shape of a reflector surface (e.g., reflector surface 402 of FIG. 4) changes as a result of the enlargement/elongation of apertures 1204-1, 1204-2, which leads to degraded antenna system level performance. Accordingly, the first and second tube doublers 1202-1, 1202-2 are designed to prevent or eliminate the possibility of an enlargement/elongation of apertures 1204-1, 1204-2 by a certain amount (e.g., less than 10% of the aperture's diameter) during use of the tube structure 1200.

Figure 14:
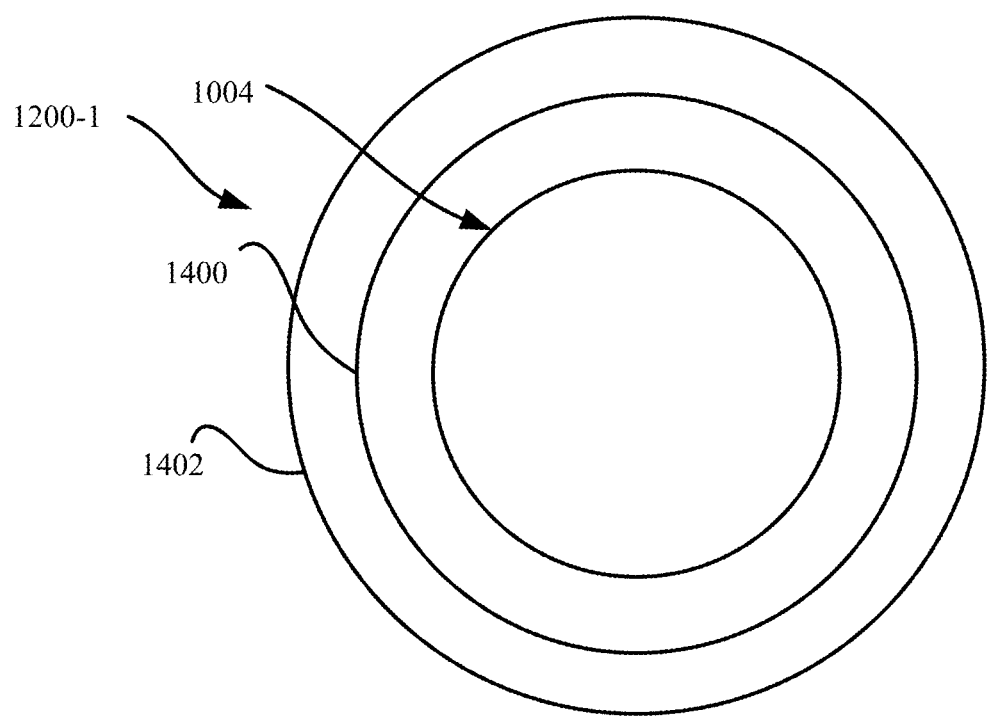
FIGS. 14-15 each provide a cross-sectional view of a composite tube structure with a tube doubler coupled thereto.
Figure 15:
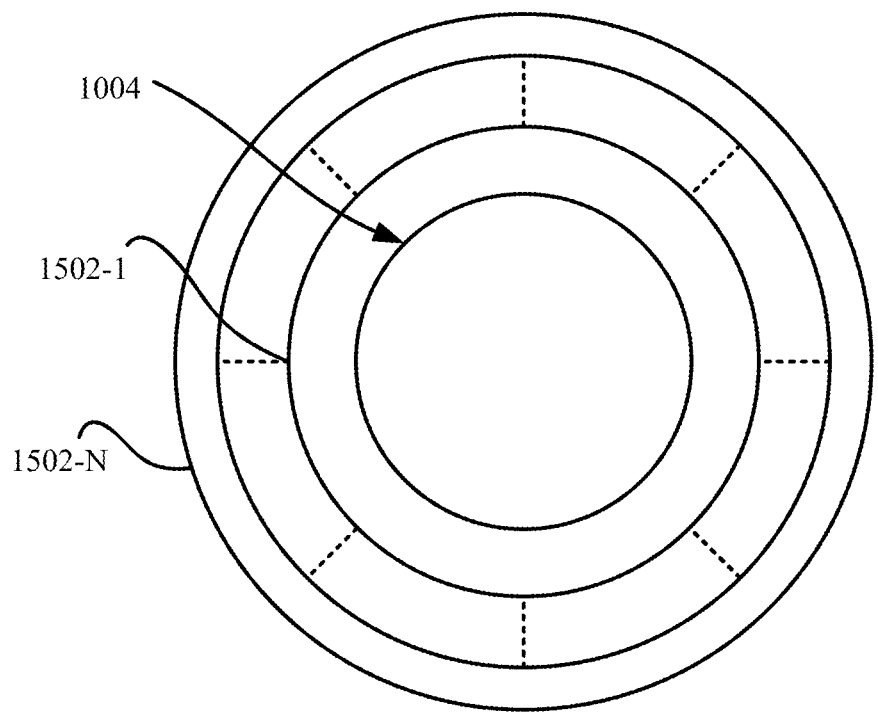

Referring now to FIG. 14, a cross-sectional view of the tube structure 1200 is provided. Notably, the tube doubler 1202-1 comprises two layers 1400, 1402 of material. The present solution is not limited in this regard. The tube doubler can include any number of material layers selected in accordance with a given application. For example, as shown in FIG. 15, a tube doubler comprises material layers 1502-1, . . . , 1502-N, where N is an integer equal to or greater than two.

There are three parameters that are necessary in order for the composite material of the tube doubler to function as intended (i.e., to prevent or eliminate the possibility of an enlargement/elongation of apertures 1204-1, 1204-2 by a certain amount). These parameters include bearing strength, hoop CTE, and axial CTE. In order for the tube structure 1200 to withstand large continuous tension loads (e.g., 300 lbs) applied to the metallic fittings 1000 and 1002, the tube doubler's composite material is designed to have a bulk bearing strength that is greater than the bearing strength of the composite tube structure 1004. In order for the tube structure 1200 to withstand thermal extremes (e.g., −220° C. to +150° C.), the hoop and axial bulk CTEs of the tube doubler are selected to respectively match the hoop and axial CTEs of the composite tube structure 1004 by a certain amount (e.g., by at least 85%) so that thermal stresses between the composite tube structure 1004 and tube doubler 1202-1, 1202-2 are mitigated at large temperature extremes. The hoop and axial bulk CTEs of the tube doublers 1202-1, 1202-2 can be tailored by: changing a ratio of carbon fibers (−CTE) to glass fibers (+CTE); changing a ratio of axial to angled plies of either or both constituent materials; and/or changing non-zero angles of either constituent material.

Notably, the hoop and axial bulk CTEs of each tube structure 1202-1, 1202-2 are different from each other (i.e., the hoop CTE≠the axial CTE). For example, in some scenarios, the axial bulk CTEs of the components 1202-1, 1202-2 are −0.1 to −0.2 ppm/° F., and the hoop bulk CTEs of the components 1202-1, 1202-2 are 4.9 to 5.6 ppm/° F. The present solution is not limited in this regard.

In order for the three above-described criteria to be met, at least two layers 1400, 1402 of the tube doubler 1200-1, 1200-2 comprise different types of material. The different types of materials include, but are not limited to, a carbon fiber material and/or a fiberglass material. The carbon fiber material may comprise a prepreg tape formed of carbon fibers and a resin. The prepreg tape may have a cured ply thickness of 3.1 mils. The carbon fibers can include, but are not limited to, M55J carbon fibers available from Toray Composite Materials America, Inc. of Tacoma, Wash. The fiberglass material may comprise a woven fabric formed of glass fibers and a resin. The woven fabric may have a thickness of 2.3 mils. The glass fibers can include, but are not limited to, 108GL glass fibers available from Nikkiso Co., Ltd. of Vietnam.

Either of the different materials can be selected to have a bearing strength that (when combined with the other different material) a tube doubler is provided with a bulk bearing strength greater than the bearing strength of the composite tube structure 1004. Similarly, either of the different materials can be selected to have hoop and axial CTEs that (when combined with the other different material) a tube doubler is provided with hoop and axial bulk CTEs respectively match the hoop and axial CTEs of the composite tube structure 1004.

Therefore, in some scenarios, the carbon fiber material is selected to have a bearing strength that is greater than the bearing strength of the composite tube structure 1004, and the fiberglass material is selected to have hoop and axial CTEs that when combined with the carbon fiber material the tube doubler 1202-1, 1202-2 has hoop and axial bulk CTEs that respectively match the hoop and axial CTEs of the composite tube structure 1004. The fiberglass material may have a bearing strength that is equal to, less than or greater than the bearing strength of the composite tube structure 1004. In other scenarios, the fiberglass material is selected to have a bearing strength that is greater than the bearing strength of the composite tube structure 1004, and the carbon fiber material is selected to have hoop and axial CTEs that when combined with the fiberglass material the tube doubler 1202-1, 1202-2 has hoop and axial bulk CTEs that respectively match the hoop and axial CTEs of the composite tube structure 1004. The carbon fiber material may have a bearing strength that is equal to, less than or greater than the bearing strength of the composite tube structure 1004. In yet other scenarios, a first carbon fiber material is selected to have a bearing strength that is greater than the bearing strength of the composite tube structure 1004, and a second different carbon fiber material is selected to have hoop and axial CTEs that when combined with the first carbon fiber material the tube doubler has hoop and axial bulk CTEs matching the hoop and axial CTEs of the underlying composite tube structure by a certain amount. The second different carbon fiber material may have a bearing strength that is equal to, less than or greater than the bearing strength of the composite tube structure 1004. The present solution is not limited to the particulars of these scenarios.

As noted above, the tube doublers 1202-1, 1202-2 can be formed during the same curing process as the composite tube structure 1004. Accordingly, the curing process 300 of FIG. 3 can be modified. A flow diagram of an illustrative modified curing process 1700 is provided in FIG. 17.

Figure 17:
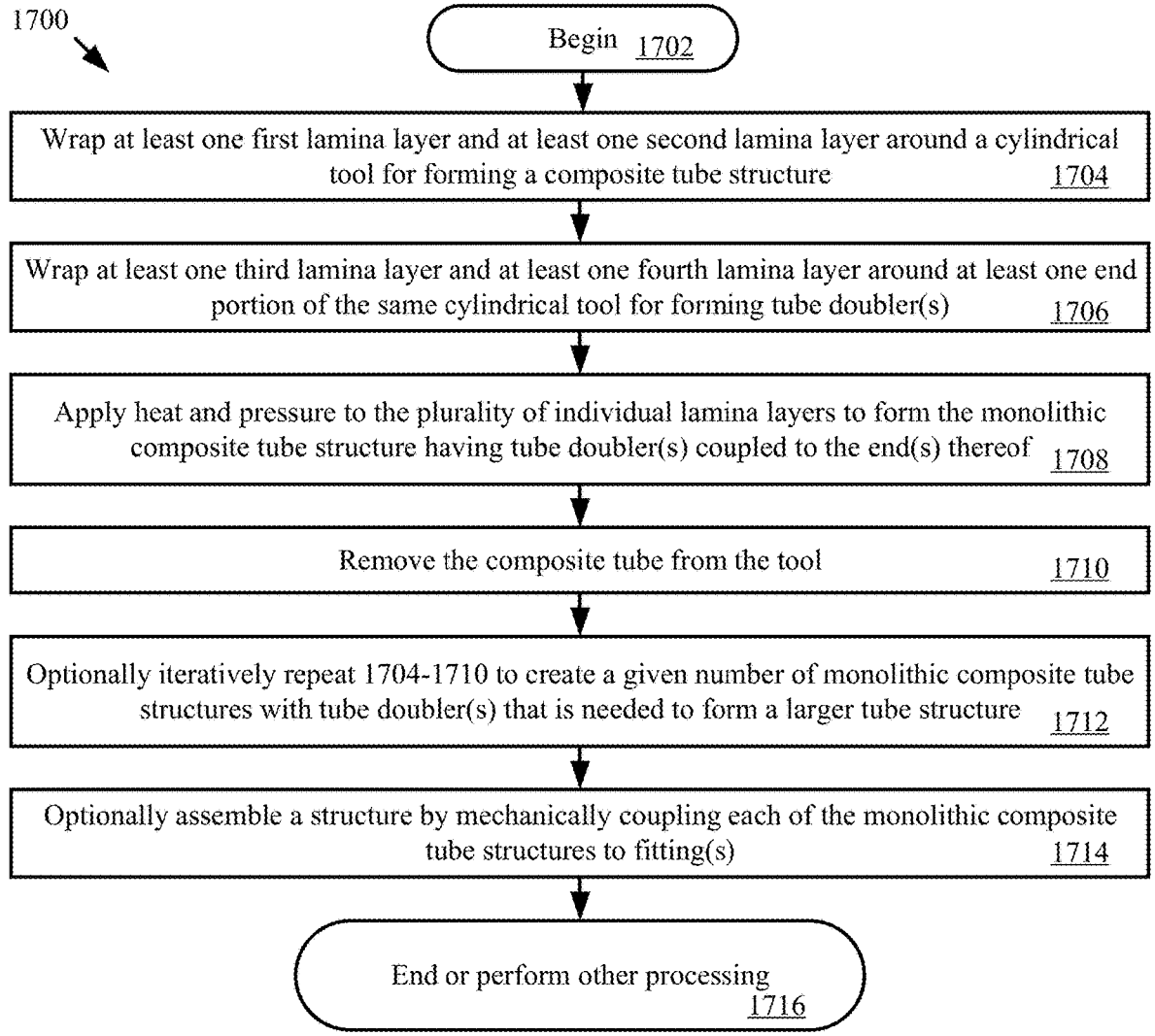
FIG. 17 is a flow diagram showing a modified curing process for fabricating a composite tube structure with tube doubler(s) at end(s) thereof.

As shown in FIG. 17, process 1700 begins with 1702 and continues with 1704 where at least one first lamina layer is wrapped around a cylindrical tool (e.g., a non-tapered male cylindrical mandrel which may be made of metal). The first lamina layer is formed of a first composite material that has a first CTE. At least one second lamina layer is also wrapped around the cylindrical tool. The second lamina layer is formed of a second composite material that is different from the first composite layer and has a second CTE that is different than the first CTE. The first lamina layers and the second lamina layers may alternate, and are provided for forming a composite tube structure (e.g., composite tube structure 1004 of FIGS. 10 and 16).

In 1706, at least one third lamina layer and at least one fourth lamina layer are wrapped around at least one end portion of the same cylindrical tool. The third lamina layer is formed of a carbon fiber material, and the fourth lamina layer is formed of a fiberglass material. A first material of the carbon fiber and fiberglass materials is selected to have a bearing strength selected to be greater than the bearing strength of the composite tube structure, and a second material of the carbon fiber and fiberglass materials is selected to have hoop and axial CTEs that when combined with the first material the tube doubler has hoop and axial bulk CTEs that respectively match the hoop and axial CTEs of the composite tube structure. The third lamina layers and the fourth lamina layers may alternate, and are provided for forming a tube doubler (e.g., tube doubler 1202-1, 1202-2 of FIG. 12).

In 1708, heat and pressure are applied to the plurality of individual lamina layers. The heat and pressure can be applied using a vacuum bag and an autoclave. Vacuum bags and/or autoclaves are well known in the art, and therefore will not be described herein. A monolithic composite tube structure (with tube doubler(s) coupled to the end(s) thereof) is formed through the application of heat and pressure in 1708. In this regard, it should be noted that resins of the first, second, third and fourth lamina layers flow when the heat and pressure are applied thereto. Polymers of the resins link together so as to couple the first, second, third and fourth lamina layers to each other. The monolithic composite tube structure has: at least one property that is different in the axial direction (e.g., axial direction 110 of FIG. 1) and the hoop direction (e.g., hoop direction 112 of FIG. 1); an axial CTE tailored to provide a net zero CTE for an assembled structure; and/or a hoop CTE tailored to match the CTE of a fitting in the hoop direction so as to reduce thermal stress in the monolithic tube structure. In some scenarios, more than fifty percent of the first and second lamina layers have fibers extending in the axial direction, and less than fifty percent of the first and second layers have fibers extending in a direction that is angled relative to the central elongate axis (e.g., central elongate axis 108 of FIG. 1) of the monolithic tube structure. The tube doubler has: a bulk bearing strength greater than the bearing strength of the monolithic composite tube structure; and hoop and axial bulk CTEs that match (by a certain amount 85-100%) the hoop and axial CTEs of the monolithic composite tube structure. The composite tube structure (with the tube doubler(s)) is removed from the cylindrical tool in 1710.

The process of 1704-1710 can be optionally iteratively repeated to create any given number of monolithic composite tube structures (with tube doublers) needed to form a larger tube structure (e.g., an antenna truss structure), as shown by 1712.

Method 1700 may continue with optional 1714. In 1714, a structure is assembled by mechanically coupling the monolithic composite tube structure (with tube doubler(s)) to at least one fitting (e.g., a metallic fitting forming a joint between two or more monolithic tube structures). In some scenarios, the structure comprises an antenna or an antenna truss structure. The fitting can include, but is not limited to, an end fitting for a tube structure. Mechanical couplers are well known in the art, and therefore will not be described herein. Any known or to be known mechanical coupler can be used herein without limitation. For example, pins can be used to facilitate the mechanical coupling between the tube structure (e.g., tube structure 1200 of FIG. 12) and the fitting(s). Subsequently, 1716 is performed where method 1700 ends or other processing is performed.

The following EXAMPLE is provided to illustrate certain embodiments of the present solution. The following EXAMPLE is not intended to limit the present solution in any way.

Example 3

An illustrative tube doubler structure that can be used in connection with the composite tube structure described above in relation to EXAMPLE 2 will now be described. The tube doubler structure is formed of a laminate material. The laminate material of the tube doubler structure is created in accordance with the above described process 1700. The particulars of the tube doubler structure's laminate material are illustrated in the following TABLE 3.

TABLE 3

| Ply # | Prepreg Material Type | Thickness (mils) | Angle |
|---|---|---|---|
| 1 | Glass Fibers/Resin | 2.3 | 0.00 |
| 2 | Carbon Fibers/Resin | 3.1 | 0.00 |
| 3 | Glass Fibers/Resin | 2.3 | −45.00 |
| 4 | Carbon Fiber/Resin | 3.1 | 0.00 |
| 5 | Glass Fibers/Resin | 2.3 | −45.00 |
| 6 | Carbon Fibers/Resin | 3.1 | 0.00 |
| 7 | Glass Fibers/Resin | 2.3 | +45.00 |
| 8 | Carbon Fibers/Resin | 3.1 | +45.00 |
| 9 | Carbon Fibers/Resin | 3.1 | −45.00 |
| 10 | Glass Fibers/Resin | 2.3 | +45.00 |
| 11 | Glass Fibers/Resin | 2.3 | +45.00 |
| 12 | Carbon Fibers/Resin | 3.1 | −45.00 |
| 13 | Carbon Fibers/Resin | 3.1 | +45.00 |
| 14 | Glass Fibers/Resin | 2.3 | +45.00 |
| 15 | Carbon Fibers/Resin | 3.1 | 0.00 |
| 16 | Glass Fibers/Resin | 2.3 | −45.00 |
| 17 | Carbon Fibers/Resin | 3.1 | 0.00 |
| 18 | Glass Fibers/Resin | 2.3 | −45.00 |
| 19 | Carbon Fibers/Resin | 3.1 | 0.00 |
| 20 | Glass Fibers/Resin | 2.3 | 0.00 |

As shown in TABLE 3, the laminate material of the tube doubler structure comprises twenty laminated layers. Layers 1, 3, 5, 7, 10, 11, 14, 16, 18 and 20 comprise woven fabric formed of glass fibers and a resin, and have a thickness of 2.3 mils. The glass fibers can include, but are not limited to, glass fibers available from Nikkiso Co., Ltd. of Vietnam. The resin of layers 1, 3, 5, 7, 10, 11, 14, 16, 18 and 20 can include, but are not limited to, an 954-3 resin available from Nikkiso Co., Ltd. of Vietnam. Layers 2, 4, 6, 8, 9, 12, 13, 15, 17 and 19 comprise a prepreg tape formed of carbon fibers and a resin, and have a cured ply thickness of 3.1 mils. The carbon fibers can include, but are not limited to, M55J carbon fibers available from Toray Composite Materials America, Inc. of Tacoma, Wash. The resin of layers 2, 4, 6, 8, 9, 12, 13, 15, 17 and 19 can include, but is not limited to, an RS-54 resin available from Toray Composite Materials America, Inc. of Tacoma, Wash.

Notably, the carbon fibers have a negative axial CTE such that they will shrink in size when exposed to increased temperatures. In contrast, the glass fibers have a positive axial CTE so that they will expand or elongate when exposed to increased temperatures. When the negative CTE constituent is combined with the positive CTE constituent in a single monolithic laminate, a net CTE is provided (e.g., a weighted average CTE of the two constituents) that comprises a zero axial CTE or a near zero axial CTE.

Each of the twenty layers contains a plurality of fibers that extend parallel to each other. Layers 1, 2, 4, 6, 15, 17, 19 and 20 are arranged so that the fibers thereof extend parallel relative to the central elongate axis (e.g., central elongate axis 1208 of FIG. 12) of the tube doubler structure. Such an arrangement of the layers 1, 2, 4, 6, 15, 17, 19 and 20 provides stiffness and strength down the central elongate axis of the tube doubler structure. The stiffness and strength in the axial direction can be decreased by removing some of the layers containing fibers that extend parallel relative to the central elongate axis, and can be increased by adding more layers containing fibers that extend parallel relative to the central elongate axis.

Layers 3, 5, 7-14, 16 and 18 are arranged so that the fibers thereof extend in a direction that is angled relative to the central elongate axis of the tube doubler structure (e.g., angled by ±45°). In order to provide the positive angled relationship between the seventh, eight, tenth, eleventh, thirteenth and fourteenth layers' fiber direction and the central elongate axis direction, the materials spiral down the length of the tube in a first direction (e.g., a clockwise direction). In order to provide the negative angled relationship between third, fifth, ninth, twelfth, sixteenth and eighteenth layers' fiber direction and the central elongate axis direction, the materials spiral down the length of the tube in a second direction (e.g., a counter clockwise or anticlockwise direction) opposed from the first direction. Such an arrangement of these layers provide transverse strength and stiffness of the tube doubler structure (i.e., strength and stiffness in the hoop direction).

The axial bulk CTE of the tube doubler structure formed of the above described laminate material is tailored by: altering the angle of the non-axial ply layers (i.e., layers 3, 5, 7-14, 16 and 18); and/or altering the ratio of the glass to carbon.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

I claim:

1. A method of making a structure, comprising:
obtaining a composite tube structure; and
coupling a tube doubler structure at any point along the composite tube structure, the tube doubler structure extending for a partial length of the composite tube structure and comprising a first lamina layer formed of a first material and a second lamina layer formed of a second material different than the first material, where the combination of the first and second materials provides a tube doubler structure with (i) a bulk bearing strength greater than a bearing strength of the composite tube structure and (ii) hoop and axial bulk coefficient of thermal expansions respectively matching hoop and axial coefficient of thermal expansions of the composite tube structure.

2. The method according to claim 1, wherein the first lamina layer and the second lamina layer are co-cured with a plurality of lamina layers used to form the composite tube structure.

3. The method according to claim 1, wherein the first material comprises a carbon fiber material and the second different material comprises a fiberglass material.

4. The method according to claim 1, wherein the first material comprises a first carbon fiber material and the second material comprises a second carbon fiber material that is different than the first carbon fiber materials.

5. The method according to claim 1, wherein the hoop bulk coefficient of thermal expansion of the tube doubler structure is different than the axial bulk coefficient of thermal expansion of the tube doubler structure.

6. The method according to claim 1, further comprising providing at least one aperture extending through the tube doubler structure and the composite tube structure.

7. The method according to claim 6, further comprising assembling the structure by inserting a pin in the at least one aperture to mechanically couple at least one metallic fitting to the tube doubler structure and the composite tube structure.

8. The method according to claim 7, further comprising using the tube doubler structure to prevent an elongation of the at least one aperture in an axial direction of the composite tube structure by a certain amount as a result of a pulling or pushing force applied to the pin.

9. The method according to claim 1, wherein the composite tube structure has at least one of (i) at least one property that is different in an axial direction than a hoop direction, and (ii) an axial coefficient of thermal expansion tailored to provide a net zero coefficient of thermal expansion for the composite tube structure.

10. The method according to claim 1, wherein the structure comprises an antenna truss structure.

11. The method according to claim 10, wherein the antenna truss structure forms at least part of a radio frequency antenna.

12. An assembled structure, comprising:
a composite tube structure; and
a tube doubler structure coupled at any point along the composite tube structure and extending for a partial length of the composite tube structure, the tube doubler structure comprising a first lamina layer formed of a first material and a second lamina layer formed of a second material different than the first material, where the combination of the first and second materials provides a tube doubler structure with (i) a bulk bearing strength greater than a bearing strength of the composite tube structure and (ii) hoop and axial bulk coefficient of thermal expansions respectively matching hoop and axial coefficient of thermal expansions of the composite tube structure.

13. The assembled structure of claim 12, wherein the first lamina layer and the second lamina layer are co-cured with a plurality of lamina layers used to form the composite tube structure.

14. The assembled structure according to claim 12, wherein the first material comprises a carbon fiber material and the second material comprises a fiberglass material.

15. The assembled structure according to claim 12, wherein the first material comprises a first carbon fiber material and the second material comprises a second carbon fiber material that is different than the first carbon fiber material.

16. The assembled structure according to claim 12, wherein the hoop bulk coefficient of thermal expansion of the tube doubler structure is different than the axial bulk coefficient of thermal expansion of the tube doubler structure.

17. The assembled structure according to claim 12, wherein at least one aperture extends through the tube doubler structure and the composite tube structure.

18. The assembled structure according to claim 17, further comprising at least one metallic fitting, and a pin that is inserted in the at least one aperture to mechanically couple the at least one metallic fitting to the tube doubler structure and the composite tube structure.

19. The assembled structure according to claim 18, wherein the tube doubler prevents an elongation of the at least one aperture in an axial direction of the composite tube structure by a certain amount as a result of a pulling or pushing force applied to the pin.

20. The assembled structure according to claim 12, wherein the composite tube structure has at least one of (i) at least one property that is different in an axial direction than a hoop direction, and (ii) an axial coefficient of thermal expansion tailored to provide a net zero coefficient of thermal expansion for the tube structure.

21. The assembled structure according to claim 12, wherein the structure comprises an antenna truss structure.

22. The assembled structure according to claim 21, wherein the antenna truss structure forms at least part of a radio frequency antenna.

23. An antenna, comprising:
a reflector; and
a structure for supporting the reflector, the structure comprising a plurality of tube structures mechanically coupled to metallic fittings, each said tube structure formed of
a composite tube structure, and
a tube doubler structure coupled at any point along the composite tube structure and extending for a partial length of the composite tube structure, the tube doubler structure comprising a first lamina layer formed of a first material and a second lamina layer formed of a second material different than the first material, where the combination of the first and second materials provides a tube doubler structure with (i) a bulk bearing strength greater than a bearing strength of the composite tube structure and (ii) hoop and axial bulk coefficient of thermal expansions respectively matching hoop and axial coefficient of thermal expansions of the composite tube structure.

24. The antenna of claim 23, wherein the first lamina layer and the second lamina layer are co-cured with a plurality of lamina layers used to form the composite tube structure.

25. The antenna according to claim 23, wherein the first material comprise a carbon fiber material and the second material comprises a fiberglass material.

26. The antenna according to claim 23, wherein the first material comprise a first carbon fiber material and the second material comprises a second carbon fiber material that is different than the first carbon fiber material.

27. The antenna according to claim 23, wherein the hoop bulk coefficient of thermal expansion of the tube doubler structure is different than the axial bulk coefficient of thermal expansion of the tube doubler structure.

28. The antenna according to claim 23, wherein at least one aperture extends through the tube doubler structure and the composite tube structure.

29. The antenna according to claim 28, further comprising at least one metallic fitting, and a pin that is inserted in the at least one aperture to mechanically couple the at least one metallic fitting to the tube doubler structure and the composite tube structure.

30. The antenna according to claim 29, wherein the tube doubler prevents an elongation of the at least one aperture in an axial direction of the composite tube structure by a certain amount as a result of a pulling or pushing force applied to the pin.

31. The antenna according to claim 23, wherein the composite tube structure has at least one of (i) at least one property that is different in an axial direction than a hoop direction, and (ii) an axial coefficient of thermal expansion tailored to provide a net zero coefficient of thermal expansion for the tube structure.

32. The antenna according to claim 23, wherein the structure comprises an antenna truss structure.

33. The antenna according to claim 32, wherein the antenna truss structure forms at least part of a radio frequency antenna.

34. The method according to claim 1, wherein the composite tube structure is formed of a plurality of lamina layers with (i) more than 50% having fibers that extend in an axial direction and (ii) less than 50% having fibers that extend in a direction angled relative to a central elongate axis of a composite tube.

* * * * *